US006453681B1

(12) United States Patent
Lak et al.

(10) Patent No.: US 6,453,681 B1
(45) Date of Patent: Sep. 24, 2002

(54) METHODS AND APPARATUS FOR LIQUID DENSIFICATION

(75) Inventors: Tibor I. Lak, Huntingdon Beach; John H. LeBlanc, Whittier; Jay K. Yoshinaga, Gardena; Martin E. Lozano, Whittier, all of CA (US)

(73) Assignee: Boeing North American, Inc., Seal Beach, CA (US)

( * ) Notice: Subject to any disclaimer, the term of this patent is extended or adjusted under 35 U.S.C. 154(b) by 0 days.

(21) Appl. No.: 09/756,494

(22) Filed: Jan. 8, 2001

Related U.S. Application Data
(60) Provisional application No. 60/198,228, filed on Jan. 10, 2000.

(51) Int. Cl.[7] .................................................. F17C 7/02
(52) U.S. Cl. .......................................... 62/50.1; 62/51.1
(58) Field of Search .................................. 62/50.1, 51.1

(56) References Cited

U.S. PATENT DOCUMENTS

| | | | |
|---|---|---|---|
| 1,866,516 A | | 5/1932 | Heyandt |
| 2,959,020 A | | 11/1960 | Knapp et al. |
| 3,850,001 A | | 11/1974 | Locke |
| 5,396,935 A | * | 3/1995 | Schegerin ..................... 141/9 |
| 5,415,001 A | | 5/1995 | Powars |
| 5,644,920 A | | 7/1997 | Lak et al. |
| 6,131,395 A | * | 10/2000 | Greene et al. .................. 62/7 |

OTHER PUBLICATIONS

"Advancement in Cryogenic Propulsion System Performance Through Propelant Densification" by Lak et al.; 32$^{nd}$ AIAA/ASME/ASAE/ASEE Joint Propulsion Conference, Lake Buena Vista, FL, Jul. 1–3, 1996.

* cited by examiner

Primary Examiner—William C. Doerrler
Assistant Examiner—Malik N. Drake
(74) Attorney, Agent, or Firm—Stout, Uka, Buyan & Mullins, LLP; Donald E. Stout

(57) ABSTRACT

An improved and simplified system for densifying a cryogenic liquid for space vehicles is provided, which includes a heat exchanger having heat exchange tubes therein for receiving a flow of liquid from a storage tank, for example a liquid propellant in a vehicle storage tank. The heat exchanger is filled around the exchange tubes with a two-component bath, the volume of a primary component substantially exceeding the volume of a secondary component. The secondary component has a boiling temperature that is lower than the boiling temperature of the primary component, and both are lower than the boiling temperature of the cryogenic liquid. In one example, the liquid to be densified is oxygen, the primary component is liquid nitrogen, and a secondary component is liquid hydrogen. The secondary component is preferably injected into the heat exchanger in separate flows to prevent localized freezing of the first component. A manifold having a plurality of injectors may be used for introducing the second component to the heat exchanger. A control system receives inputs from one or more sensors within the heat exchanger and operates valves that control the flow of the first and second components of the heat exchange bath.

28 Claims, 4 Drawing Sheets

METHODS AND APPARATUS FOR LIQUID DENSIFICATION

This application claims the benefit under 35 U.S.C. 119(e) of the filing date of Provisional Application Serial No. 601198,228, filed on a Jan. 10, 2000.

FIELD OF THE INVENTION

The present invention relates to methods and apparatus for densifying cryogenic liquids and, more particularly, to a simplified system for densifying liquid for long term storage, or for use in propulsion systems as densified propellant or reactant.

BACKGROUND OF THE INVENTION

Propulsion systems utilizing cryogenic liquid oxygen and/or hydrogen, such as the Space Shuffle, Atlas/Centaur, Delta, etc., are currently filled from the facility storage tanks and subsequently allowed to cool in the flight tanks in order to reject the heat absorbed by the liquid as a result of environmental heat leak, transfer line, and tank wall chill-down. The cooling of the liquid bulk is desirable in order to increase the liquid density so that more impulse mass can be stored in the tank, and also to reduce the liquid vapor pressure so that the tank operating pressure and tank weight is minimized.

The next generation of advanced reusable launch vehicle (RLV) propulsion systems requires significant improvements in vehicle performance and operational cost reduction in order to make travel into space economically feasible. Recent efforts toward achieving these goals have focused primarily on high performance rocket engines, lightweight composite structures, lightweight/durable thermal protection systems, and lightweight storage tanks. Except for the use of slush hydrogen (mixture of liquid and solid), improvements in cryogenic liquid propellant properties have not been actively pursued.

An alternative to slush propellant has been identified that is simple, low cost, and provides significant vehicle weight and operational cost reductions. The concept involves the super cooling, or densification, of liquid oxygen and hydrogen below the present operating temperature experience. Densification of cryogenic propellants improves fluid properties (density and vapor pressure), which subsequently results in smaller tanks (~11% $LO_2$, and~7% $LH_2$), and lower tank operating pressures. FIG. 1 illustrates the improvement in thermo-physical properties of liquid oxygen ($LO_2$) as a function of sub-cooled temperature. As is clear from the chart, lowering the temperature of oxygen results in higher density and lower vapor pressure. The triple point of oxygen, at approximately 98° R, is illustrated at the left, while the boiling point, at approximately 162° R, is shown at the right.

These propellant attributes result in significant weight savings for new launch vehicles or increased payload capability for existing launchers. Vehicle sizing studies for the single-stage-to-orbit RLV indicate a total weight reduction between 15 to 30 percent due to propellant densification. FIG. 2 illustrates the savings realized by utilizing densified liquid oxygen and liquid hydrogen in the fuel tanks of a reusable launch vehicle, such as the Space Shuttle. More specifically, the use of densified fluids results in approximately a 17% reduction in vehicle gross lift-off weight (GLOW). In addition to large vehicle weight reduction propellant densification increases the storage time of the cryogenic liquids without venting between 4 to 10 fold.

Also, the cost per pound of weight saved with densification is an order of magnitude less than with other weight savings candidates (aluminum-lithium tank, filament wound $LH_2$ tank, composite structure, or advanced main engines).

Because propellant densification promises large vehicle weight reduction with low ground cooling unit investments cost, densification has been recognized as an enabling technology for future launch vehicle designs, or a significant performance improvement to existing reusable or expendable launchers. Currently, systems used to service the fuel tank of the space shuttle require an expensive 3-stage compressor to reduce a liquid nitrogen heat exchange bath temperature sufficiently to maintain liquid oxygen being densified at about 120° R. With larger and more expensive compressors, the liquid oxygen temperature could be reduced even farther, although the slush point of liquid nitrogen at about 115° R provides a lower limit.

The prior art method for generating sub-cooled cryogenic liquid fuel is based either on directly lowering the heat exchanger bath pressure, or lowering the bath temperature through the use of a refrigeration system. Both of these concepts require the use of rotating machinery and a significant external power source. The primary disadvantages of using rotating machinery (vacuum pump, compressor, expander, turbine, etc.) to generate low temperature cryogens are that such densification systems tend to be complex, they are less reliable, they require periodic maintenance/ground check-out operation, and they are relatively expensive.

A system for densifying liquid propellant is disclosed in U.S. Pat. No. 5,644,920, issued to Lak et al. The '920 patent includes a heat exchanger wherein liquid propellant is cooled and thus densified. The heat exchanger bath is either the liquid propellant itself, or a different liquid. For example, propellant liquid oxygen may be cooled with even colder liquid oxygen, or with liquid nitrogen. The heat exchanger bath fluid is cooled using a vacuum pump or compressor that lowers the bath pressure such that it boils at a lower temperature. The use of a vacuum pump or compressor to cool the heat exchanger bath, however, introduces significant complexity and cost to the densification system. For example, it is estimated that a multi stage compressor necessary to cool a liquid nitrogen heat exchanger bath to 120° R, and having a sufficient flow capacity for cooling liquid propellant stored in the fuel tank of rocket, costs on the order of several million dollars. In addition, the relatively large and complex compressors and associated motors require constant maintenance, and checkout. Furthermore, a relatively large power supply is required to support the compressor. And finally, the introduction of high-voltage machinery with rotating parts in the presence of various propellants at a launch site introduces an inherent safety risk. Thus, while the system disclosed in the '920 patent functions very effectively for its intended purpose, a simpler, safer, and more efficient approach would be desirable for cost-critical applications.

Although densified/subcooled liquids are highly desirable for propulsion systems to reduce launch vehicle size and operating cost, densified liquids also benefit ground and space based storage systems by reducing the size of the storage tank or by increasing the storage time.

SUMMARY OF THE INVENTION

The present invention provides a liquid densification system that is simple, inexpensive and safe. In contrast with prior densification systems, no expensive compressor is required to reduce the temperature of the heat exchange bath, and liquid being cooled, within the heat exchanger. Instead, the heat exchanger utilizes a primary, inert component and a secondary component for the heat exchange bath. The primary component fills a majority of space around the heat exchange tubes, while the secondary component is colder and is injected when needed. This arrangement permits the temperature of the liquid to be reduced in a very short time without the need for a high-voltage power supply and maintenance for the heat exchanger in and around the launch vehicle.

In one aspect of the present invention, a system for cooling and densifying a liquid includes an inlet supply line and a heat exchange tank having a plurality of heat exchange tubes therein, each tube being in fluid communication with the in let supply line. An outlet line is in fluid communication with each of the heat exchange tubes. A first inlet conduit connects to the heat exchange tank to introduce a first component of a heat exchange bath to the interior of the heat exchange tank, and into contact with the exterior of heat exchange tubes. A second inlet conduit connects to the heat exchange tank to introduce a second component of the heat exchange bath to the interior of the heat exchange tank, and into contact with the exterior of heat exchange tubes. The densified liquid may be directed to a ground storage tank or vehicle tank, such as for a space vehicle, and the liquid to be densified may be recirculated from the tank to the heat exchange tank.

The system may include first and second flow control valves for metering the introduction of the first and second components of the heat exchange bath. Furthermore, the system may include at least one sensor, such as a fluid level or temperature sensor, within the heat exchange tank to supply input to a controller that operates the flow control valves. A mixer may be provided within the heat exchange tank for circulating and mixing heat exchange bath therein. Preferably, the volume of the first component of the heat exchange bath substantially exceeds the volume of the second component, and the second component is introduced through a plurality of injectors into the second component.

A further aspect of the present invention involves a method for densifying liquid including filling a tank with a densified liquid at a reduce temperature, circulating the liquid from the tank to a plurality of heat exchange tubes within a heat exchanger, and providing a two-component heat exchange bath in the heat exchanger for cooling the liquid to be densified within the exchange tubes. The method also preferably includes the step of providing a first component of the heat exchange bath having a first boiling temperature, and a second component of the exchange bath having a second boiling temperature lower than the first boiling temperature. Desirably, both the first and second boiling temperatures are lower than the boiling temperature of the liquid propellant.

In one specific embodiment, the liquid to be densified is oxygen, the first component of the heat exchange bath is an inert liquid, and second component has a boiling temperature that is substantially lower than the boiling temperature of the first component. The first component may be nitrogen, and second component may be hydrogen. The method further may include injecting the hydrogen along separate flow paths into the heat exchanger to prevent localized freezing of the nitrogen.

The present invention, together with additional features and advantages thereof, may best be understood by reference to the following description taken in connection with the accompanying illustrative drawings.

DESCRIPTION OF THE PREFERRED EMBODIMENTS

The present invention eliminates the need for large and expensive compressors and associated hardware in favor of a heat exchanger that utilizes two bath components: a first inert component constituting the majority of the bath, and a second component that is colder than the first component. The two components are =channeled into the heat exchanger tank as needed to super-cool a liquid flowing through the heat exchange tubes. The use of two components, with the primary component being inert, enables a safe and cost-effective densification operation. One specific example of a system to cool liquid oxygen is the use of liquid nitrogen as the primary bath component, and liquid hydrogen as the secondary bath component.

Figure 1:
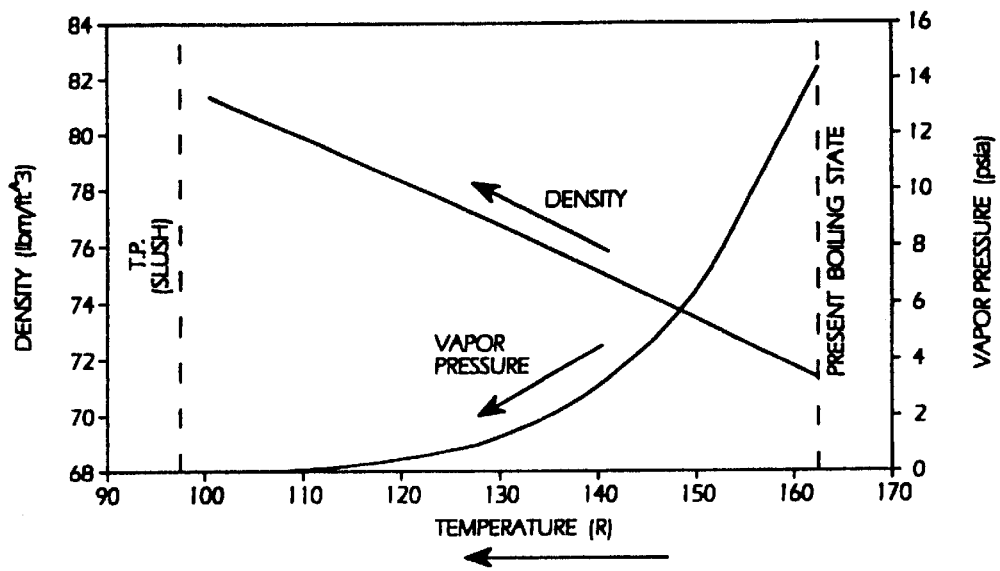
FIG. 1 is a graph showing the relationship between temperature, density, and vapor pressure of cryogenic oxygen.
Figure 2:
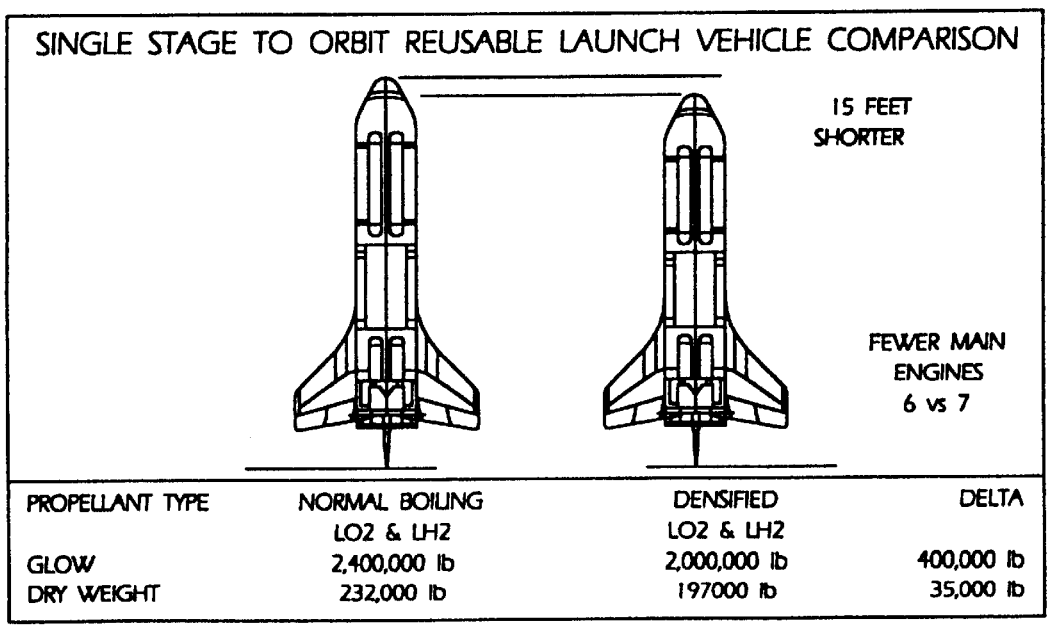
FIG. 2 illustrates the difference in weight of two launch vehicles, one utilizing liquid propellant at its normal boiling temperature, and the other utilizing densified liquid propellant.
Figure 3:
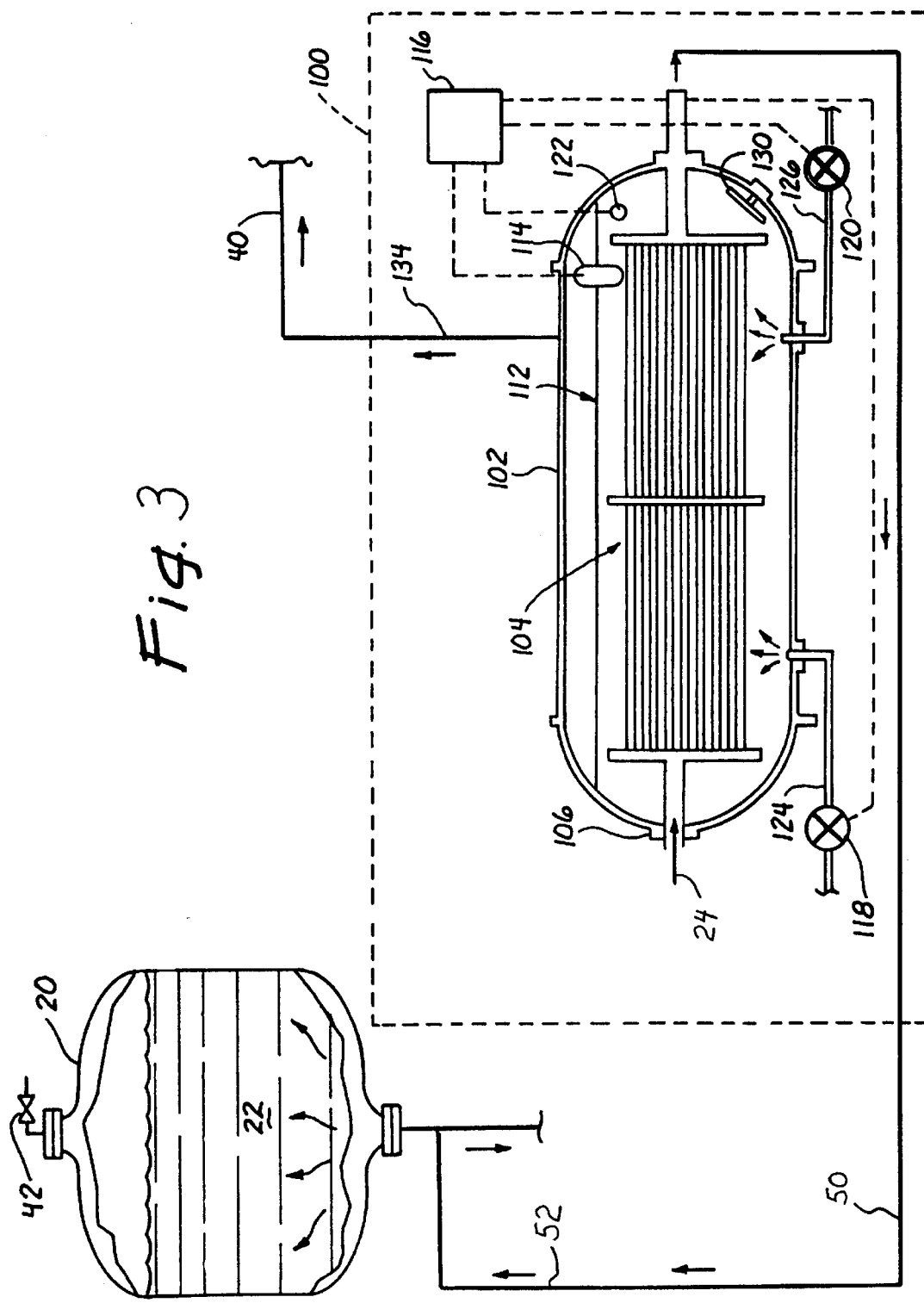
FIG. 3 is a schematic diagram of a liquid densification system of the present invention.

FIG. 3 illustrates a liquid densification system 100 of the present invention that has improved performance and is greatly simplified in relation to prior systems. The system 100 may be associated with a vehicle tank 20 containing a cryogenic liquid 22 as shown, or may be used to supply densified liquid (e.g., a propellant) to a long term storage tank in a ground- or spaced-based storage facility. The liquid 22 originally enters the system 100 from a main facility transfer line 24 connected to an external source of liquid (not shown). The typical situation is liquid oxygen, with an initial temperature of about 120° R.

An emergency relief valve 42 is typically provided on the vehicle tank 20 for in-flight pressure relief in case of a pressurization system failure during ascent of the vehicle. The emergency release valve 42 is not used on the ground, however, and is only there to protect the vehicle after lift-off.

The system 100 comprises a heat exchange tank 102 having a plurality of the exchange coils or tubes 104 therewithin. The liquid to be densified enters the tubes 104 through the tank wall at inlet 106. After passing through tubes 104, the now cold and dense liquid passes through line 50 and back to the storage tank 20 via main feed line 52.

A fluid heat exchange bath 112 within the tank 102 and outside of heat exchange tubes 104 is maintained at a level above the tubes using level sensor 114, controller 116, and a pair of bath inlet valves 118 and 120. That is, controller 116 receives input from the liquid level sensor 114 and provides output to the control valve 118. In addition, a temperature sensor 122 in the bath 112 provides a second input to controller 116 to regulate the position of valve 120.

The present applicants have advantageously determined that it is possible to eliminate expensive and high maintenance compressors or other such equipment in favor of an innovative and simplified two-liquid heat exchange bath 112. That is, a first liquid enters heat exchange tank 102 via line 124, and is metered by valve 118. The first liquid mixes with a second liquid that enters tank 102 via line 126, the second liquid being metered by valve 120. Preferably, the first liquid comprises the majority of the bath 112 and is relatively inert. The first liquid maybe referred to as the primary component of bath 112. A preferred first liquid is nitrogen, although other inert liquids, such as argon and neon, may be contemplated. The second liquid is colder than the first liquid, and is injected into the tank 102 only when needed to cool the first liquid. A preferred second liquid is hydrogen, although alternatives, such as helium or neon, may be contemplated. The second liquid is therefore referred to as the secondary component of bath 112.

The first liquid injected into tank 102 has a boiling temperature that is lower than the boiling temperature of the liquid being densified. The second liquid has a boiling temperature that is lower than the boiling temperature of the first liquid. By using the first liquid, which is inert, as the primary component of cooling bath 112, the process is made relatively safe. The first liquid is used as a vehicle for the second liquid, which is injected to reduce the temperature of first liquid to a magnitude sufficient to cool and density the liquid passing through tubes 104. For example, if the first liquid is liquid nitrogen with a boiling temperature of approximately 139.3° R, the bath 112 temperature can be reduced to as low as 114° R (triple point) by a metered introduction of liquid hydrogen, which has a boiling temperature of around 36.5° R.

Figure 5:
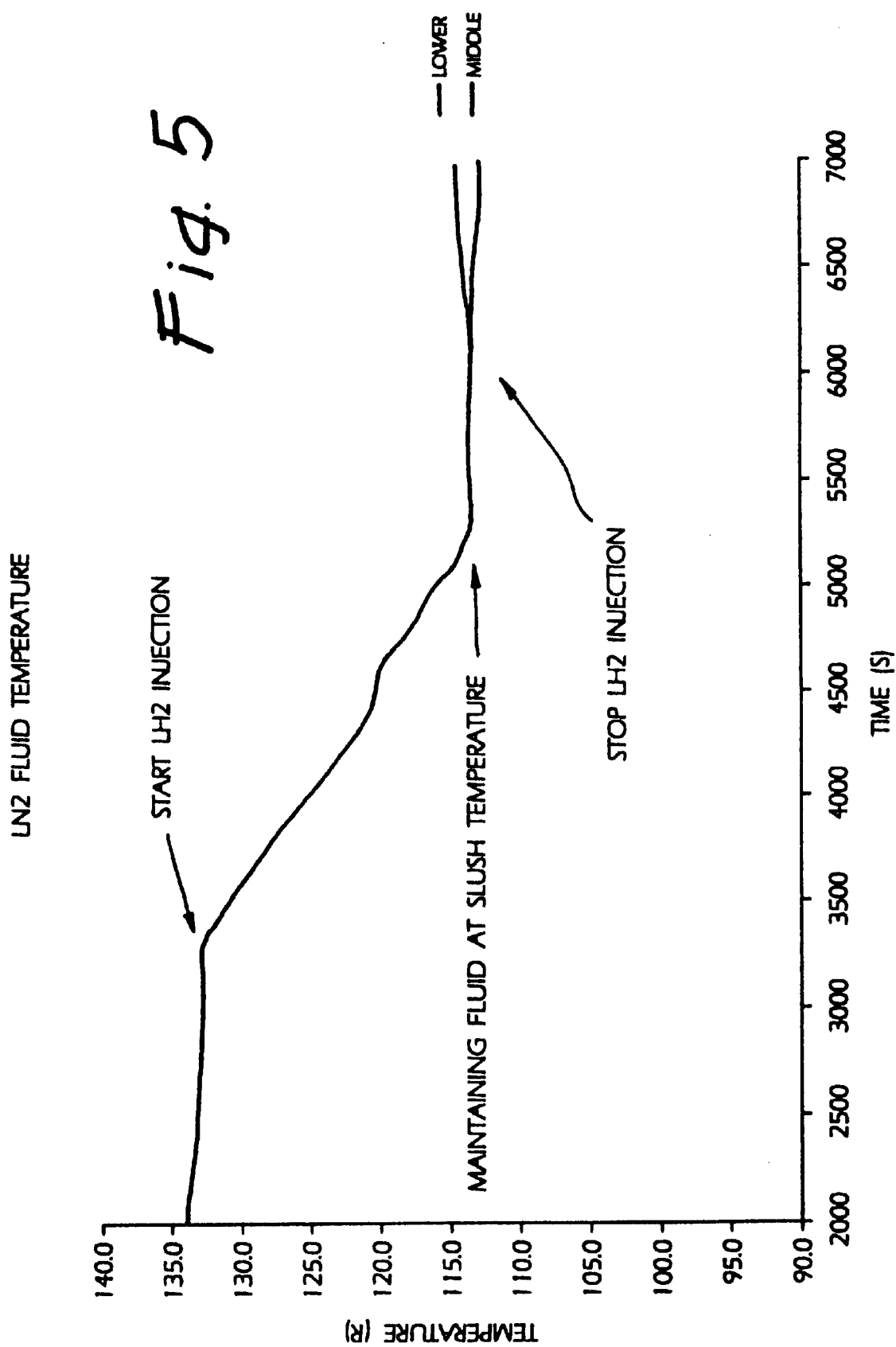
FIG. 5 is a graph of the temperature of a heat exchange bath over time, where a second, colder liquid is gradually introduced to a first liquid.

Tests have been performed to insure that nitrogen as the first liquid (primary component) and hydrogen as the second liquid (secondary component) can be successfully mixed to reduce and maintain the bath temperature to that needed to cool and density liquid oxygen. FIG. 5 illustrates the results of such tests, with a bath temperature shown over a period of time after liquid hydrogen injection into an existing, larger quantity of liquid nitrogen. More specifically, the bath temperature is initially around 139.3° R. At a time indicated on the graph as about 3500 seconds, liquid hydrogen injection commences. The bath temperature reduces at a nearly linear rate in conformance with the constant input flow of liquid hydrogen. At just past 5,000 seconds, the bath temperature has been reduced to around 114° R, or to the slush temperature of liquid nitrogen. At around 6,000 seconds, the liquid hydrogen injection is halted.

In an operating system, various temperature sensors such as sensor 122 in FIG. 3 may be provided around the heat exchange tank to monitor the bath temperature. If the bath temperature begins to rise above a threshold value, the controller 116 can signal valve 120 to increase liquid hydrogen flow.

A further component of the present system 100 comprises a mixer 130 seen in the bottom right portion of the tank 102 in FIG. 3. The mixer 130 maybe employed to help circulate the bath 112 and thoroughly mix the two bath liquids. Furthermore, the mixer 130 may be used to facilitate heat transfer between the tubes 104 and bath 112. That is, in prior systems the bath 112 comprised liquid at its boiling temperature. This liquid state is highly efficient for transferring heat to and from heat exchange coils or tubes. The present invention utilizes a liquid bath 112 that is below the boiling temperature, and thus the mixer 130 may be desirable to improve the heat exchange efficiency and reduce heat exchanger size.

The injected second liquid rapidly warms and vaporizes. The gaseous byproduct exits the heat exchange tank 102 through vent line 134, and ultimately enters vent line 40. Some of the first liquid may be entrained within the gaseous byproduct from boiling of the second liquid, and thus must be replenished. Liquid level sensor 114 is monitored by controller 116, and additional first liquid is added by actuating valve 118.

Various arrangements are possible for introducing the first and second liquids comprising the heat exchange bath 112. It is believed that an arrangement in which the second, colder liquid is split into a plurality of flow paths prior to coming into contact with the first liquid is preferred. This, in turn, helps prevent localized freezing of the second liquid. For example, if nitrogen is used as the first liquid, and hydrogen as the second liquid, the hydrogen is approximately 100° R colder than the nitrogen, and well below the slush temperature of nitrogen. Therefore, splitting the flow of hydrogen into a plurality of paths reduces the magnitude of localized cooling at the points at which the hydrogen mixes with the nitrogen. Stated another way, for any one of the separate flows of hydrogen, the heat of the surrounding nitrogen is sufficient to prevent localized freezing.

The injection of the second flow may be accomplished in a variety of ways. For example, one piping arrangement for injecting the second, colder liquid into the bath may be used with a heat exchanger that has an inner tank (preferably tubular) surrounded by an outer tank, with the heat exchange tubes arranged longitudinally within the inner tank. A second bath liquid inlet pipe communicates with a second liquid inlet manifold and is disposed horizontally across the upper portion of the inner tank. A plurality of downwardly directed injectors are in flow communication with the interior of the inlet manifold. The injectors are desirably evenly spaced along the manifold, and along a length that is greater than the length of the heat exchange tubes. In operation, the first bath liquid is cause to flow into the inner tank until the level of the first bath liquid exceeds the lower most ends of the injectors, and preferably just below the manifold. After the liquid to be densified is flowing through the heat exchange tubes, the second bath liquid is introduced into contact with the first bath liquid via the manifold and injectors. Second bath liquid passes through the manifold and into the inner tank through outlet orifices at the lower most end of the injectors. Because of the separated flow paths of the second bath liquid, localized freezing will be deterred. Furthermore, the downwardly directed injectors help prevent clogging because any freezing of the first liquid which may occur around the injectors will be less likely to agglomerate on the injectors. That is, in contrast to an upwardly directed pipe, frozen particles of first liquid cannot fall by gravity into the injectors.

Alternatively, the second liquid flow may be injected through the bottom, through the side, or from the top of the heat exchanger. For example, the tank could be oriented vertically with the second liquid inlet manifold also being oriented vertically, the liquid entering through the bottom of the manifold.

Figure 4:
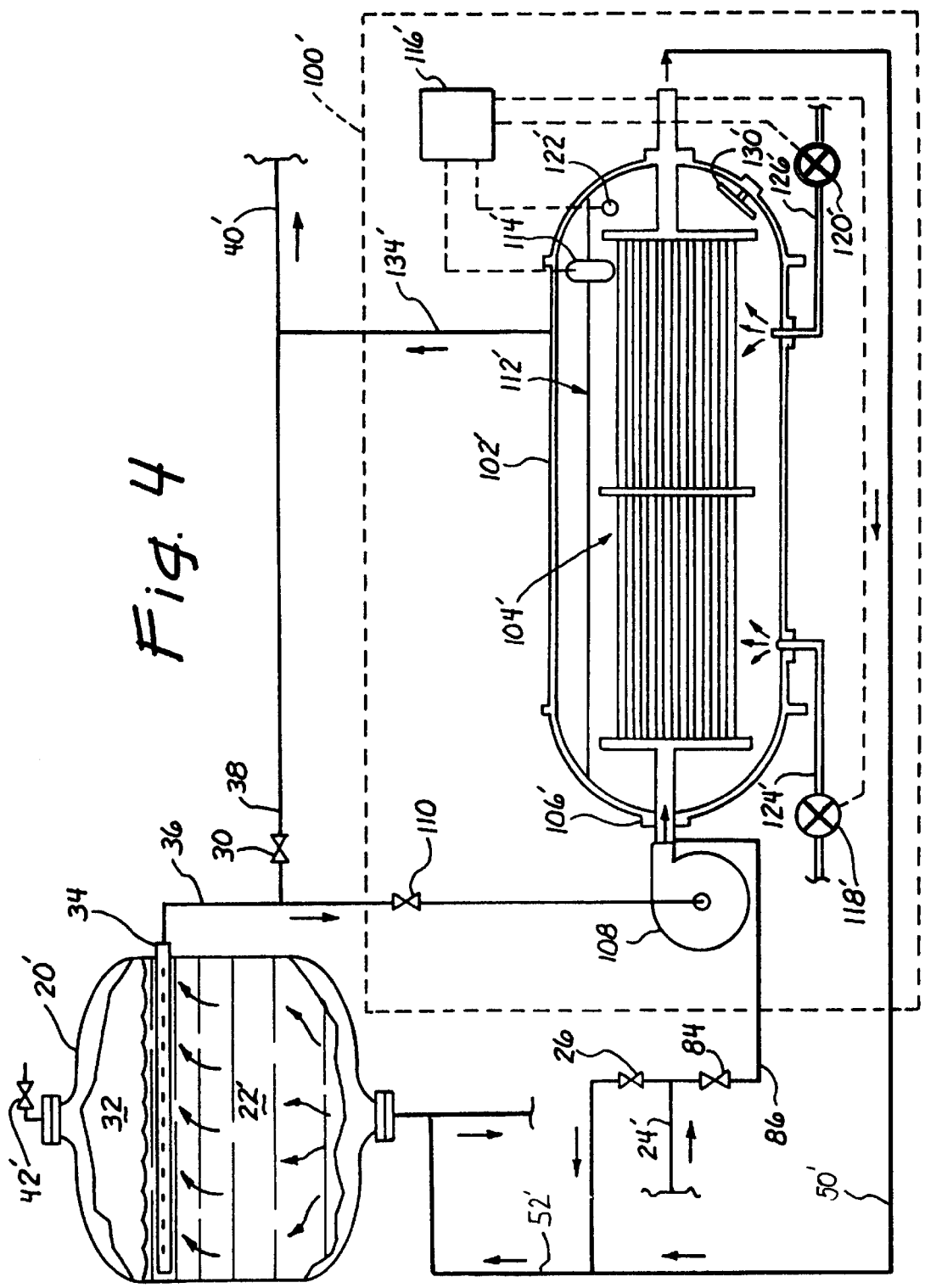
FIG. 4 is a schematic diagram of an alternative liquid densification system of the present invention having a liquid recirculation line.

FIG. 4 illustrates an alternative densification system 100' of the present invention that is in many ways similar to the system 100 of FIG. 3, and as such, like elements will be numbered the same with a prime (') designation. As before, the system 100' comprises a heat exchange tank 102' having a plurality of the exchange coils or tubes 104' therewithin. The liquid to be densified enters the tubes 104' through the tank wall at inlet 106'.

In the alternative embodiment, the liquid is recirculated through the heat exchange tank 102' and the storage tank 20'.

In this embodiment, the liquid originates at a manifold 34 positioned at the top of the storage tank 20' and travels through a recirculation line 36, to a pump 108. A pump valve 110 may be provided in line 36 to shut off flow to the pump 108. After passing through tubes 104, the now cold and dense liquid passes through recirculation line 50' and back to the storage tank 20' via main feed line 52'.

A ground vent valve 30 remains open during loading of the vehicle tank 20' to accommodate the boil off generated as a result of filling the warmer tank, which gives off heat to the liquid 22'. This heat absorption creates a boil off of the liquid 22' that generates gas 32 in the upper portion of the tank 20'. Prior to the liquid level reaching a recirculation manifold 34, the gas 32 passes through apertures in the manifold, and through a recirculation line 36 to the open vent valve 30. The vented gas continues through a vent line 38 to a facility line 40 where it can be recaptured in the facility or dumped.

Removal of the vent valve from vehicle tank 20' and placing it on the ground is one of the primary benefits of the prior and current densification systems. Namely, because the vent valve is on the ground and not on the vehicle, the weight of the vehicle is greatly reduced. Again, an emergency relief valve 42' is provided on the vehicle tank 20' for in-flight pressure relief in case of a pressurization system failure during ascent of the vehicle. The emergency release valve 42' is not used on the ground, however, and is only there to protect the vehicle after lift-off.

When the liquid 22' rises above the recirculation manifold 34, flow in the recirculation line 36 transitions from gaseous to liquid. At this point, the ground vent valve 30 is closed, and the densification system, denoted within dotted line 100', is primed. Flow into the tank 20' via main feed line 52' continues to fill both the tank and densification system 100'.

The initial temperature of the liquid 22' may have risen above a desired level from the tank filling process and attendant warming. Therefore, the liquid 22' must be recirculated through a heat exchanger of the densification system 100' adjacent the launch vehicle to reduce the temperature once again.

A fluid heat exchange bath 112' within the tank 102' and outside of heat exchange tubes 104' is maintained at a level above the tubes using level sensor 114', controller 116', and a pair of bath inlet valves 118' and 120'. That is, controller 116' receives input from the liquid level sensor 114' and provides output to the control valve 118'. In addition, a temperature sensor 122' in the bath 112' provides a second input to controller 116' to further regulate the positions of valve 120'.

A first liquid enters heat exchange tank 102' via line 124', and is metered by valve 118'. The first liquid mixes with a second liquid that enters tank 102' via line 126', the second liquid being metered by valve 120'.

Again, the first liquid comprises the majority of the bath 112' and is relatively inert, being referred to as the primary component of bath. A preferred first liquid is nitrogen, and a preferred second liquid is hydrogen. The second liquid is therefore referred to as the secondary component of bath 112'.

A further component of the present system 100' comprises a mixer 130' seen in the bottom right portion of the tank 102' in FIG. 4. The mixer 130' may be employed to help circulate the bath 112' and thoroughly mix the two bath liquids. Furthermore, the mixer 130' may be used to facilitate heat transfer between the tubes 104' and bath 112'. That is, in prior systems the bath 112' comprised liquid at its boiling temperature. This liquid state is highly efficient for transferring heat to and from heat exchange coils or tubes. The present invention utilizes a liquid bath 112' that is below the boiling temperature, and thus the mixer 130' may be desirable to improve the heat exchange efficiency and reduce heat exchanger size.

The injected second liquid rapidly warms and vaporizes. The gaseous byproduct exits the heat exchange tank 102' through vent line 134', and ultimately enters vent line 40'. Some of the first liquid may be entrained within the gaseous byproduct from boiling of the second liquid, and thus must be replenished. Liquid level sensor 114' is monitored by controller 116', and additional first liquid is added by actuating valve 118'.

As before, the injection of the second flow may be accomplished in a variety of ways. The second flow may be injected through the bottom, through the side, or from the top of the heat exchanger.

While this invention has been described with respect to various specific examples and embodiments, it is to be understood that the invention is not limited thereto and that it can be variously practiced within the scope of the following claims.

What is claimed is:

1. A system for cooling and densifying a liquid, comprising:
   an inlet supply line for supplying a liquid;
   a heat exchange tank having a plurality of heat exchange tubes therein, each of the heat exchange tubes being in fluid communication with the inlet supply line;
   an outlet line in fluid communication with each of the heat exchange tubes;
   a first inlet conduit connected to the heat exchange tank for introducing a first component of a heat exchange bath to the interior of the heat exchange tank and in contact with the exterior of the heat exchange tubes; and
   a second inlet conduit connected to the heat exchange tank for introducing a second component of a heat exchange bath different than the first component to the interior of the heat exchange tank and in contact with the exterior of the heat exchange tubes.

2. The system of claim 1, further including a first flow control valve located in the first conduit for metering introduction of the first component to the interior of the heat exchange tank.

3. The system of claim 2, further including a second flow control valve located in the second conduit for metering introduction of the second component to the interior of the heat exchange tank.

4. The system of claim 3, further including at least one sensor within the heat exchange tank and a controller connected to receive input from the sensor, the controller being connected to operate the first and second flow control valves based on the input received from the sensor.

5. The system of claim 4, wherein the sensor is a fluid level sensor.

6. The system of claim 4, wherein the sensor is a temperature sensor.

7. The system of claim 4, wherein there is a fluid level sensor and a temperature sensor providing input to the controller.

8. The system of claim 1, further including a mixer provided within the heat exchange tank for mixing the heat exchange bath therein.

9. The system of claim 1, further including a manifold in fluid communication with the second inlet conduit and configured to separate the flow of the second liquid into separate flow paths into the interior of the heat exchange tank.

10. The system of claim 9, wherein the manifold is located in an upper portion of the heat exchange tank.

11. The system of claim 10, wherein the manifold is oriented horizontally across the heat exchange tank.

12. The system of claim 11, wherein the heat exchange tubes are oriented horizontally within the heat exchange tank and have a length, and the manifold is longer than the heat exchange tubes.

13. The system of claim 9, wherein the manifold includes a plurality of flow orifices for delivering the second liquid to the interior of the heat exchange tank.

14. The system of claim 13, wherein the manifold is located in an upper portion of the heat exchange tank and includes a plurality of downwardly directed injectors, the lowermost end of each flow injector defining the flow orifices for delivering the second liquid to the interior of the heat exchange tank.

15. The system of claim 9, wherein the manifold is oriented vertically within the heat exchange tank.

16. The system of claim 1, wherein the system is adapted to supply the densified liquid to a storage tank, and further including:
a recirculation line connected between the storage tank and the inlet supply line for returning liquid from the storage tank to the heat exchange tubes; and
a return line connected between the storage tank and the outlet line for returning densified liquid from the heat exchange tubes to the storage tank.

17. A method of densifying a liquid, comprising:
filling a storage tank with a liquid at a reduced temperature;
circulating the liquid from the storage tank through a plurality of heat exchaage tubes within a heat exchanger; and
providing a two-component beat exchange bath in the heat exchanger for cooling the liquid within the heat exchange tubes, wherein each of the two components in said two-component heat exchange bath directly contact said plurality of heat exchange tubes.

18. The method of claim 17, where the step of providing comprises providing a first component of the heat exchange bath having a first boiling temperature, and providing a second component of the heat exchange bath having a second boiling temperature lower than the first boiling temperature.

19. The method of claim 18, wherein the first and second boiling temperatures are both lower than the boiling temperature of the liquid to be densified.

20. The method of claim 17, further including providing a primary component of the heat exchange bath and a secondary component of the heat exchange bath, the volume of the primary component substantially exceeding the volume of the secondary component.

21. The method of claim 20, wherein the primary component of the heat exchange bath is an inert liquid.

22. The method of claim 21, wherein the liquid to be densified is liquid oxygen and the primary component is liquid nitrogen.

23. The method of claim 22, wherein the secondary component is liquid hydrogen.

24. A method of densifying a liquid, comprising:
filling a storage tank with a liquid at a reduced temperature;
circulating the liquid from the storage tank through a plurality of heat exchange tubes within a heat exchanger; and
providing a two-component heat exchange bath in the heat exchanger for cooling the liquid within the heat exchange tubes, where the step of providing comprises providing a first component of the heat exchange bath and a second component of the heat exchange bath, and introducing the second component to the heat exchanger in more than one flow path.

25. The method of claim 24, further including introducing the second component of the heat exchange bath through a plurality of injectors.

26. The method of claim 25, wherein the injectors are located in an upper portion of the heat exchange bath and oriented so that the plurality of flows of the second component is directed downward.

27. A method of densifying a liquid, comprising:
filling a storage tank with a liquid at a reduced temperature;
circulating the liquid from the storage tank through a plurality of heat exchange tubes within a heat exchanger;
providing a two-component heat exchange bath in the heat exchanger for cooling the liquid within the heat exchange tubes; and
further including monitoring tee level and temperature of the heat exchange bath and adjusting the flows of the two components accordingly.

28. The method of claim 27, wherein the monitoring is done with sensors within the heat exchange tank and the adjusting is done with flow control valves, the method including transmitting signals from the sensors to a controller, and transmitting signals from the controller to the flow control valves.

* * * * *